(12) United States Patent
Cai et al.

(10) Patent No.: US 12,007,177 B2
(45) Date of Patent: Jun. 11, 2024

(54) INTERTWINED COIL HEAT EXCHANGER

(71) Applicant: Aquarden Technologies ApS, Skævinge (DK)

(72) Inventors: Zhuoyan Cai, Skævinge (DK); Jens Bækgaard, Skævinge (DK)

(73) Assignee: Aquarden Technologies ApS, Skævinge (DK)

( * ) Notice: Subject to any disclaimer, the term of this patent is extended or adjusted under 35 U.S.C. 154(b) by 134 days.

(21) Appl. No.: 17/414,052

(22) PCT Filed: Dec. 17, 2019

(86) PCT No.: PCT/DK2019/050405
§ 371 (c)(1),
(2) Date: Jun. 15, 2021

(87) PCT Pub. No.: WO2020/125900
PCT Pub. Date: Jun. 25, 2020

(65) Prior Publication Data
US 2022/0034594 A1 Feb. 3, 2022

(30) Foreign Application Priority Data
Dec. 17, 2018 (EP) .................................... 18213064

(51) Int. Cl.
*F28D 7/02* (2006.01)
*B01J 3/00* (2006.01)
*B01J 19/24* (2006.01)
*F28D 7/00* (2006.01)

(52) U.S. Cl.
CPC .............. *F28D 7/024* (2013.01); *B01J 3/008* (2013.01); *B01J 19/2415* (2013.01); *F28D 7/0083* (2013.01); *B01J 2219/00083* (2013.01); *F28D 7/022* (2013.01)

(58) Field of Classification Search
None
See application file for complete search history.

(56) References Cited

U.S. PATENT DOCUMENTS

| | | | |
|---|---|---|---|
| 1,915,352 | A | 6/1933 | Robert |
| 1,922,844 | A | 8/1933 | Epstein |
| 4,909,318 | A | 3/1990 | Ymse |
| 5,046,548 | A | 9/1991 | Tilly |

(Continued)

FOREIGN PATENT DOCUMENTS

| | | |
|---|---|---|
| BE | 509907 A | 3/1952 |
| CN | 105823348 A | 8/2016 |

(Continued)

OTHER PUBLICATIONS

Extended European Search Report; European Patent Office; European Application No. 18213064.1; Sep. 5, 2019; 6 pages.

(Continued)

*Primary Examiner* — Jennifer A Leung
(74) *Attorney, Agent, or Firm* — Taft Stettinius & Hollister LLP

(57) ABSTRACT

The present invention relates to the field of heat exchangers, especially those having a plurality of tubular fluid channels formed as intertwined coils, with each of the centre paths of the coils forming a helix, and to a reactor for supercritical water oxidation comprising such a heat exchanger.

38 Claims, 17 Drawing Sheets

(56) References Cited

U.S. PATENT DOCUMENTS

| | | | |
|---|---|---|---|
| 5,165,472 | A | 11/1992 | Cloutier |
| 5,832,739 | A | 11/1998 | Bacchus |
| 2014/0364676 | A1 | 12/2014 | Chen et al. |
| 2017/0097194 | A1* | 4/2017 | Klaves ............... F28F 3/025 |
| 2017/0175684 | A1 | 6/2017 | Neal et al. |

FOREIGN PATENT DOCUMENTS

| | | |
|---|---|---|
| CN | 106574827 A | 4/2017 |
| CN | 106643254 A | 5/2017 |
| DE | 2938324 A1 | 4/1981 |
| DE | 3220957 A1 | 12/1983 |
| EP | 0074570 A2 | 3/1983 |
| FR | 1374955 A | 10/1964 |
| FR | 2494830 A1 | 5/1982 |
| GB | 228502 A | 6/1925 |
| GB | 2137332 A | 10/1984 |
| JP | H08121981 A | 5/1996 |
| WO | 2017198275 A1 | 11/2017 |

OTHER PUBLICATIONS

International Search Report; European Patent Office; International Application No. PCT/DK2019/050405; Feb. 19, 2020; 5 pages.

Written Opinion of the International Searching Authority; European Patent Office; International Application No. PCT/DK2019/050405; Feb. 19, 2020; 6 pages.

International Preliminary Report on Patentability; European Patent Office; International Application No. PCT/DK2019/050405; Jul. 1, 2021; 7 pages.

Chinese Office Action; China National Intellectual Property Administration; Chinese Application No. 201980083901.2; Feb. 15, 2023; 11 pages.

Chinese Search Report; China National Intellectual Property Administration; Chinese Application No. 201980083901.2; Mar. 4, 2024; 2 pages.

Chinese Office Action; China National Intellectual Property Administration; Chinese Application No. 201980083901.2; Mar. 7, 2024; 7 pages.

* cited by examiner

INTERTWINED COIL HEAT EXCHANGER

CROSS-REFERENCE TO RELATED APPLICATIONS

This application is a U.S. National Phase of International PCT Application No. PCT/DK2019/050405 filed on Dec. 17, 2019, which claims priority to European Patent Application No. 18213064.1 filed Dec. 17, 2018, each of which are incorporated herein by reference in their entirety.

FIELD OF THE INVENTION

The present invention relates to the field of heat exchangers, especially those having a plurality of tubular fluid channels formed as intertwined coils, with each of the centre paths of the coils forming a helix, and to a reactor for supercritical water oxidation comprising such a heat exchanger.

BACKGROUND OF THE INVENTION

The mechanical structure of a heat exchanger is key to facilitating efficient heat redistribution, such as for recovering energy in a supercritical water oxidation reactor. The coiled tube heat exchanger offers unique advantages: simultaneous heat transfer between more than two streams, a large heat transfer area, and promotes flow turbulence for enhancing heat transfer. Therefore, coiled tube heat exchangers are one of the three classical heat exchangers, i.e. shell and tube, double pipe, and coiled tube, used for large scale liquefaction systems. Helical coils are used for various processes because they can accommodate a large heat transfer area in a compact space, with high heat transfer coefficient. Helical coil heat exchangers are widely used because of their compact structure, ease of production, and mainly due to the increase of heat transfer rate in comparison with straight pipe heat exchangers. The centrifugal force induced due to the curvature of the tube results in the secondary flow known as Dean Vortex superimposed on the primary flow which enhances the heat transfer. Some prior art documents have incorporated helical coil heat exchangers into reactors in an attempt to achieve a structure that strikes the right balance of heat redistribution.

For example, EP0074570 discloses a mixer or reactor for carrying out chemical reactions, in particular for highly viscous media, that essentially consists of alternately left-handed and right-handed helically coiled pipe coils wound onto a core pipe. Since the helically coiled pipe coils are wound onto a core pipe, the coils appear to share the same centre path or axis, which appears to be a straight path or axis passing through the centre of the core pipe. According to a preferred embodiment, the coil diameter and the number of turns of the coils increase from the inside to the outside in such a way that the coils fill the entire cross section uniformly, i.e. that the packing density of the coils is constant over the cross section. The heat exchanger requires a considerable number of inlet and outlet connections to achieve the desired heat exchange surface area and density. In addition, the flow length, pitch, and diameter of each coil is not the same, which does not allow a uniform heat transfer conditions for each coil.

Many studies have been carried out to investigate the heat transfer characteristics in coiled tubes, and to explore the merits of spiral coiled heat exchangers as compared to conventional parallel type heat exchangers. The convective heat power from a water coil may be expressed as a function of multiple variables, such as a mean temperature difference, the overall coil pipe surface, and the overall heat transfer coefficient. The heat transfer coefficient may be expressed as a function of multiple variables, such as the heat transfer coefficient at the inner surface of the coil pipe, the conduction thermal resistance of the coil pipe dependent on the material and thickness of the pipe wall, the equivalent heat transfer coefficient of the finned surface, the tube area between fins and the fin surface, the fin efficiency, and the number of fins.

It is thus widely accepted that coiled heat exchangers offer advantages over parallel type heat exchangers. However, as of yet, there has not been disclosed a specific structure for a multiple coiled heat exchanger that optimizes heat transfer, and that is suitable for supercritical water oxidation reactors.

Hence, an improved heat exchanger suitable for a supercritical water oxidation reactor would be advantageous, and in particular a more efficient, easy to assemble, and reliable helical coil structure would be advantageous.

OBJECT OF THE INVENTION

It is a further object of the present invention to provide an alternative to the prior art.

In particular, it may be seen as an object of the present invention to provide a multiple coil heat exchanger suitable for a supercritical water oxidation reactor, that solves the above mentioned problems of the prior art with maintaining optimal heat redistribution, such as for efficient extraction of salt from supercritical fluid. It is desired to have a multiple coil heat exchanger with minimal fluid connections while achieving a high heat transfer area, where the flow conditions along each of the multiple coils are identical, where the assembly of the heat exchanger is simple and minimizes the number of inlet/outlet fluid connections within the heat exchanger.

SUMMARY OF THE INVENTION

Thus, the above described object and several other objects are intended to be obtained in a first aspect of the invention, by providing a heat exchanger having a plurality of tubular fluid channels formed as intertwined coils, such as helical coils, with each of the centre paths of the coils being distant and forming a helix.

Unlike the prior art in which no coils, or only some coils, are intertwined, this structural arrangement maximizes the interweaving of coils by having each of the coils intertwined with each of the other coils, such that the amount of overlapping of planar representations of the windings of the coils may be the same along the length of the coils.

Furthermore, since each of the centre paths of the coils of the present invention are represented as both unique and helical, as opposed to a common and/or linear centre path or axis as in the prior art, this allows that the centre paths of the coils may themselves be intertwined helixes, generally resulting in a flow pattern providing a higher transfer coefficient (h). To express this conceptually, the helixes are occurring on two cumulative levels, with the first level being the helical coils and the second level being the helical centre paths or axes of the coils, resulting in amplification of the Dean vortex and an increase in turbulence of the fluid passing through the coils.

According to preferred embodiment, the heat exchanger may as an alternative to the planar representation be disclosed as the inner volume of each coil winding encompassing the centre path of each of the other coil windings.

In addition, and in preferred embodiments, the inner volume of each coil may overlap the inner volumes of all the other coils in the heat exchanger, such that the centremost axis of the heat exchanger may also may be encompassed by the inner volume of every coil. This gives more compact and dense heat exchanger than the prior art.

In a preferred embodiment of the present invention, the intertwining of the coils also occurs on two cumulative levels, the first level being the intertwining of the coils themselves, and the second level being intertwining of the helical paths of the coils. This unique structural combination of cumulative helixes and cumulative intertwining provides both (i) an optimal surface area and (ii) an optimal flow pattern, resulting in efficient redistribution of energy, such as for maintenance of an advantageously positioned "salt mirror" in a supercritical water oxidation reactor. This may also ensure the same flow conditions in every coil, e.g. same pitch, curvature and length.

The amount of heat redistribution may be expressed as a function of the surface area of the coils relative to the volume within the coils, and the flow pattern of the heat exchanger. The invention is particularly, but not exclusively, advantageous for obtaining efficient heat redistribution in a supercritical water oxidation reactor.

According to a first embodiment of the present invention, a heat exchanger may comprise a plurality of tubular fluid channels, and each of these tubular fluid channels may have an external tubular diameter or equivalent diameter and two openings into the interior of the tubular fluid channel, which may be arranged at distant end positions of the fluid channel. Each of the plurality of tubular fluid channels may be formed as a helical coil, over at least a part of their lengths, and each coil may be provided as a plurality of windings with a pitch being larger than its external tubular diameter. Each of the coils may evolve with a centre path, and the coils of the plurality of tubular fluid channels may be intertwined around one another, with the centre path of each coil being distant from the centre path of the other coils, and each of the centre paths may form a helix. Each of said centre paths preferably forming a helix may have essentially identical curvature. Preferably, the helical centre paths of the coils also intertwine around one another. The centre paths of the coils themselves may be intertwined, such as intertwined helixes.

Further, in a transverse cross section of the heat exchanger according to preferred embodiments of the invention, a planar representation of a winding of a first of said coils may overlap a planar representation of a winding of each of the other said coils of said plurality of tubular fluid channels. This also means that for all the planar representations of the windings in a cross section of the heat exchanger, all the planar representations overlap each other. This may be the case for all cross sections taken along the heat exchanger or at least for one or more sections thereof.

Preferably, in, preferably each and every of, said transverse cross sections of the heat exchanger, the centremost axis of the heat exchanger may be encompassed by a planar representation of a winding of each, and preferably every, of said coils of said plurality of tubular fluid channels.

In some preferred embodiments, all the planar representations of the coils may have a common intersection, whereby the centre point of each planar representation may be fully within the common intersection, and with the centremost axis of the heat exchanger preferably being within the common intersection.

In some preferred embodiments, said planar representation of the winding of the first of said coils may encompasses the centre path of each of the other coils.

In some preferred embodiments, an amount, such as evaluated by area percentage, of overlap of said planar representation of the winding of the first of said coils with each said planar representation of the winding of each of the other said coils may be essentially equal.

In some preferred embodiments, said amount of overlap of said planar representation of the winding of the first of said coils with each said planar representation of the winding of each of the other said coils may be at least 30%, such as at least 50%, preferably at least 70% of a total area of the planar representation of the winding of the first of said coils, and preferably less than 90%.

In some preferred embodiments, the centre path, such as helical centre path, of at least one of said coils may complete at least one full revolution, traversing at least 360 degrees as the path, such as helical centre path, proceeds longitudinally through the windings of each of said at least one coil.

In some preferred embodiments, the centre paths of the coils themselves may be intertwined, such as intertwined helixes.

In some preferred embodiments, each of the coils may be provided as a plurality of windings, and wherein the number of said plurality of windings of each coil may be larger than 10, such as larger than 30, preferably larger than 40, and preferably less than 200.

The term "distant", as used throughout the description and as claimed, is understood to mean unique and does not indicate any particular distance, and the statement "the centre path of each coil being distant from the centre path of the other coils" does not exclude the possibility of the centre paths intertwining in space. In fact, according to a preferred embodiment, the helical centre paths of the coils may also be intertwined.

The term "intertwined", as used throughout the description and as claimed, may be understood to comprise both complete intertwining and partial intertwining of elements. Furthermore, the term "intertwined" has no implication of an amount of distance, or lack thereof, between the elements to be intertwined.

The terms "wall" and "body" when referring to the reactor wall and reactor body, as used interchangeably throughout the description and claimed.

The term "single plane" is understood to be an approximate cross-sectional plane perpendicular to the longitudinal axis of the heat exchanger that encompasses all of the coils of the heat exchanger, in order to conceptually understand the patterns formed by the centre points of the planar representations. Likewise, the term "planar representation" is understood to be a flat approximation of the windings which are not actually flat in a perfectly planar view.

The term "pitch" as used herein is used in a manner being ordinary to a skilled person to reference the distance between the same two positions in a winding, as e.g. shown in FIG. 9 indicated by "pitch".

The terms "space" and "gap" when referring to the area between the loose liner and the reactor wall are used interchangeably throughout the description and as claimed.

The term "centremost axis" of the heat exchanger may understood to reference a an axis in the heat exchanger arranged in the centre of the heat exchanger.

The term equivalent diameter, D, may be understood as $D = 4 \ast$ cross sectional area/length of perimeter.

The term "centre point" may be understood as geometric center of a e.g. a planar representation being the arithmetic mean position of all the points in the planar representation.

The term "Inner volume" as used e.g. in inner volume of each coil, may be understood to reference the volume circumscribed by the coil.

The term "Centre path" as used in e.g. centre path of a coil, may be understood to reference the path described by the centre points.

In any of these embodiments, a planar representation of a winding of each of the coils of the tubular fluid channels may be circular. The centre points of such planar representations of the windings of the coils may form a symmetrical shape or a straight line in a single plane. The planar representations of the windings of the coils may overlap due to the overlapping of adjacent windings, and the amount of overlapping of the planar representations of the windings may be the same along the length of the coils or may follow a repeating pattern along the length of the coils. The centre point of the planar representation for the entire heat exchanger may also be located inside the planar representation of the winding of each and every coil. The symmetrical shape may be an equilateral triangle or a regular polygon. In any of these embodiments described hereinabove, the plurality of tubular fluid channels may be two, three, four, five or even six. The tubular fluid channels may be formed as coils over at least sixty percent of their lengths.

Additionally, in any of these embodiments, the external tubular diameter of each tubular fluid channel may be between 15.0 mm and 3 mm, such as between 10.0 mm and 5.0 mm. The encompassing diameter of each coil of the plurality of tubular fluid channels, being provided as a plurality of windings, may be between 200.0 mm and 20.0 mm, such as between 100.0 mm and 50.0 mm.

In any of these embodiments, the number of said plurality of windings of each coil may be larger than 10, such as larger than 30, preferably larger than 40 and smaller than 50. Each coil of the tubular fluid channels may be substantially identical to the other coils. Each of the plurality of tubular fluid channels may be made from metal.

In a further embodiment of the present invention, the distance between the centre paths of said coils may be selected to provide a substantially tubular, central space extending through-out the inside of all of the coils; however, each of the coils preferably overlaps with each of the other coils. The heat exchanger may comprise at least one non-coiled tubular fluid connection arranged in such a substantially tubular, central space, and the coils of the plurality of the fluid channels may both twist around the non-coiled tubular fluid connection and simultaneously preferably encompass the non-coiled tubular fluid connection inside the inner volumes of every coil. The at least one non-coiled tubular fluid connection may extend beyond the coils of the plurality of tubular fluid channels intertwined around one another. Alternatively, the coils of the plurality of tubular fluid channels intertwined around one another may extend beyond said at least one non-coiled tubular fluid connection.

In some preferred embodiments, each coil may be provided as a plurality of windings with a pitch being larger than its said external tubular diameter.

In some preferred embodiments, adjacent winding of the coils may overlap at least along a part of the coils.

In some preferred embodiments, each coil may be provided as a plurality of windings with a pitch preferably being less than twice its external tubular diameter.

In some preferred embodiments, adjacent winding of the coils may not overlap at least along a part of the coils.

According to a second aspect of the present invention, is disclosed a reactor for supercritical water oxidation. The reactor may comprise:

- a reactor wall forming a reactor enclosure that may be configured to withstand pressure and temperature in the supercritical region of water,
- a heat exchanger, according to any of the preceding embodiments, enclosed in the interior of the reactor enclosure.

The reactor may further comprise at least one reactor fluid connection extending into the reactor enclosure for introducing fluid into, or extracting fluid from, the reactor enclosure. At least one of these reactor fluid connections may be fluidly connected to the plurality of tubular fluid channels.

According to any of these embodiments, the reactor may further comprise a plurality of heating and cooling elements on said reactor wall for controlling the level of the supercritical point of said fluid in reference to the height of the heat exchanger.

The reactor may further comprise a loose liner in the reactor enclosure. A space between the loose liner and said reactor wall may be in fluid connection with at least one of the reactor fluid connections. A space between the loose liner and the reactor wall may be in fluid connection with at least one of the tubular fluid channels.

In some preferred embodiments, the loose liner may completely encloses the reactor enclosure.

In some preferred embodiments, the reactor may preferably further comprise at least one reactor fluid outlet connection (74, 75) extending into the reactor enclosure for extracting fluid from said reactor enclosure.

According to an alternative embodiment of the supercritical water oxidation reactor according to the present invention, the reactor may comprise an upper oxidation chamber within the reactor enclosure. The upper oxidation chamber may be in fluid connection with the plurality of tubular fluid channels, and the heat exchanger may be located beneath the upper oxidation chamber. The upper oxidation chamber may occupy at least eighty percent of the volume of said reactor enclosure above said heat exchanger.

In some preferred embodiments, a reactor for supercritical water oxidation according the second aspect, may comprise two or more of the heat exchangers according to the first aspect.

The first and second aspects of the present invention may each be combined with any of the other aspects. These and other aspects of the invention will be apparent from and elucidated with reference to the embodiments described hereinafter.

BRIEF DESCRIPTION OF THE FIGURES

The intertwined coil heat exchanger according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1A:
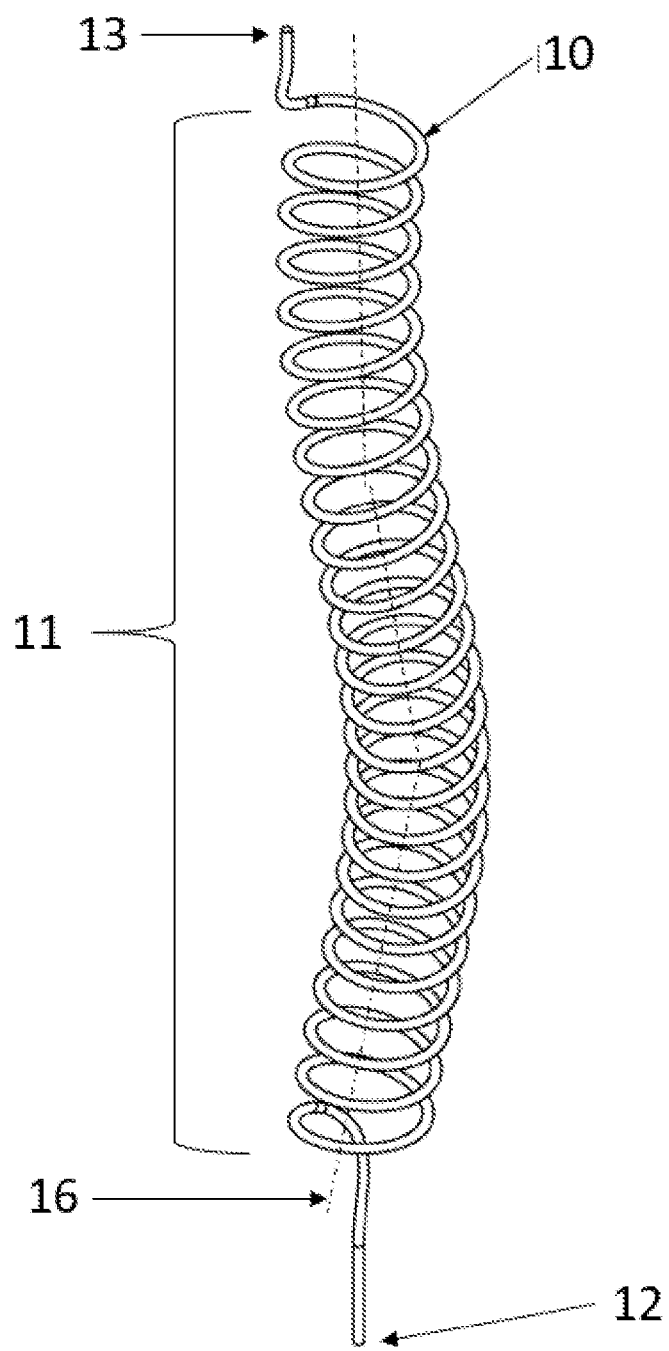
FIGS. 1A, 1B and 1C show isometric, side, and top views respectively, of a single tubular fluid channel, isolated from an exemplary heat exchanger according to the present invention, formed as a helical coil and having a helical centre path.
Figure 1B:
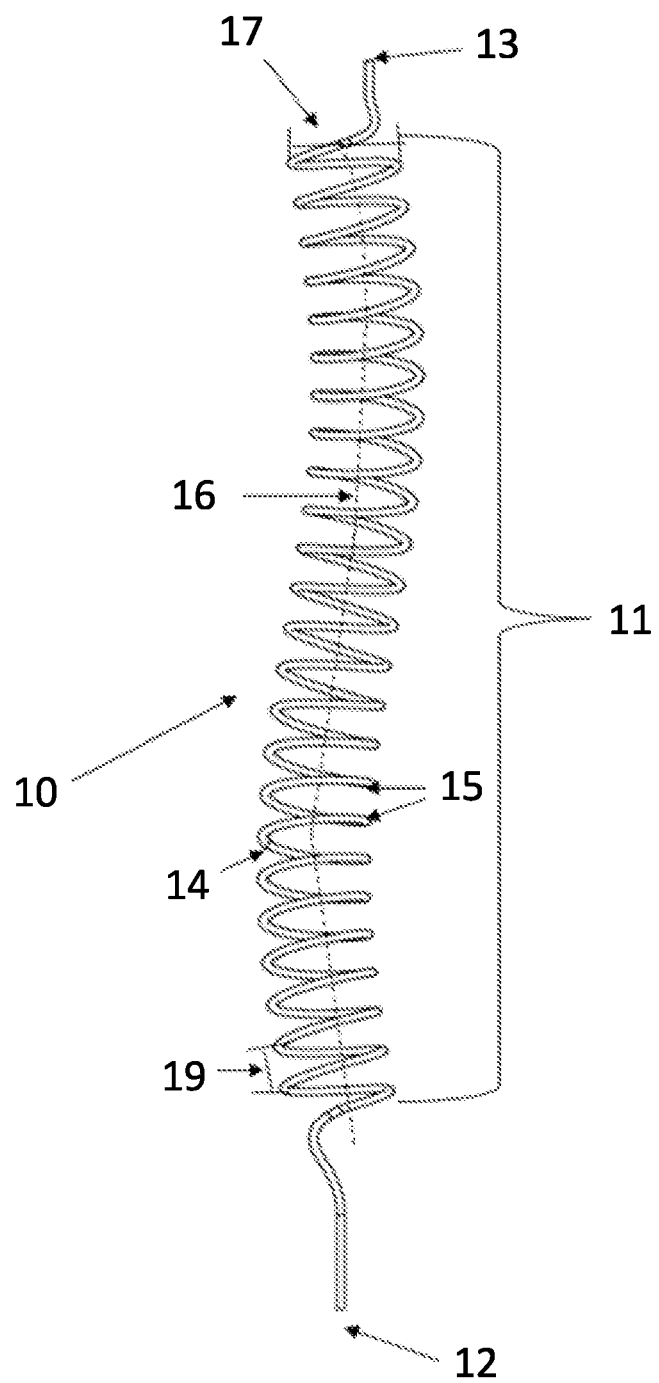
Figure 1C:
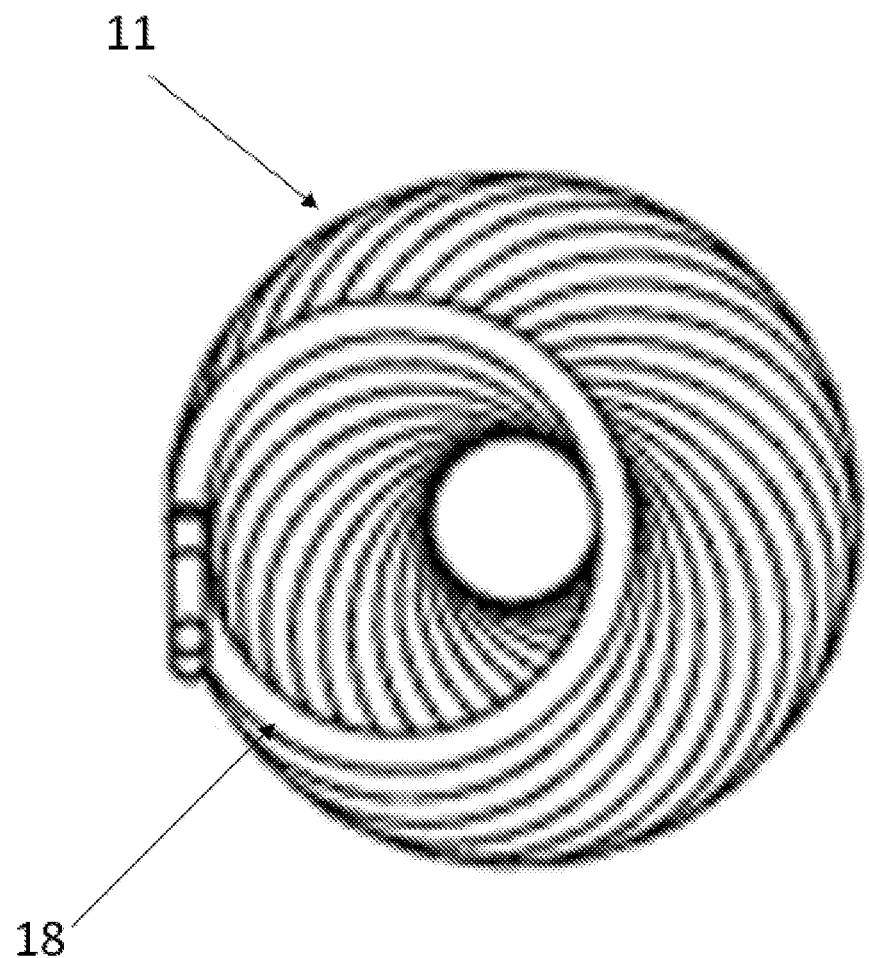

Reference is made to FIGS. 1A, 1B and 1C showing vertical, horizontal, and top views respectively, of a single tubular fluid channel 10, isolated from an exemplary heat exchanger of the present invention, which comprises at least two tubular fluid channels. The single tubular fluid channel 10 may be isolated from the exemplary heat exchanger according to FIGS. 2A-2C, or from the exemplary heat exchanger according to FIGS. 3A-3D, which will be described further in accordance with these drawings herein below. Due to the complexity of the structure of the heat exchanger, it may be preferable to first study the structure of an isolated single tubular fluid channel. In this exemplary drawing, the tubular fluid channel 10 is formed as a helical coil 11 over approximately eighty percent of its length. In alternative embodiments, the tubular fluid channel 10 is preferably formed as a helical or non-helical coil over at least sixty percent of its length to optimize the coil surface area.

The tubular fluid channel 10 has an external tubular diameter or equivalent diameter 14, and two openings 12 and 13 into the interior of the tubular fluid channel arranged at distant end positions of the fluid channel, which are generally a fluid inlet and a fluid outlet respectively. The external tubular diameter or equivalent diameter 14 may be between 15.0 mm and 3 mm, such as between 10.0 mm and 5 mm. In this drawing, the tubular channel has a circular cross section, such that the external tubular diameter 14 of the coil is its outer circumference divided by Pi.

The coil 11 is provided as a plurality of windings 15 with a pitch 19, represented as a distance between the windings, being equal to or larger than the external tubular diameter 14. These relative dimensions allow for a space in between the windings 15 to intertwine at least one other coil so as to form an intertwined multiple coil heat exchanger with overlapping windings. The overlapping may be easily recognised in FIG. 3C, for instance. The space required between the windings 15 increases according to the number of coils of the heat exchanger. Since the coil 11 may be isolated from the heat exchanger according to FIGS. 3A-3D, which has three coils, there is adequate space between the windings 15 of the coil 11 to insert, at least partially, two other coils into this space, allowing three coils to be intertwined and with adjacent overlapping windings. Although the space in this drawing is equal between each of the windings, this is merely exemplary. For example, in one alternative arrangement of the present invention, one or more of the coils may comprise a smaller space such as to accommodate one other coil.

The coil 11 evolves with a centre path 16 forming a helix. Note that the centre paths in FIGS. 1 and 2 are depicted for illustration purposes only as a line having straight segments, although it evolves forming a helix. The coil 11 in this drawing has twenty-four windings 15, but each coil, according to alternative embodiments of the present invention may have more than 30 windings, preferably larger than and smaller than 50 windings. The encompassing diameter 17, which in this drawing is a helical diameter, is the diameter of the entire coil or helix. The encompassing diameter 17 may be between 200.0 mm and 20.0 mm, such as between 100.0 mm and 50 mm. In FIG. 1C, it may be seen that the coil 11 from the top view is represented as a circular planar representation 18 of a winding of the coil 11 following a helical path as it progresses from one end of the coil to the other end. Alternatively, the planar representation of a winding may be elliptical. The tubular fluid channel may be made from metal, which is preferable for facilitating heat exchange, or from any other sturdy material configured to withstand passage of fluid therethrough.

Figure 2A:
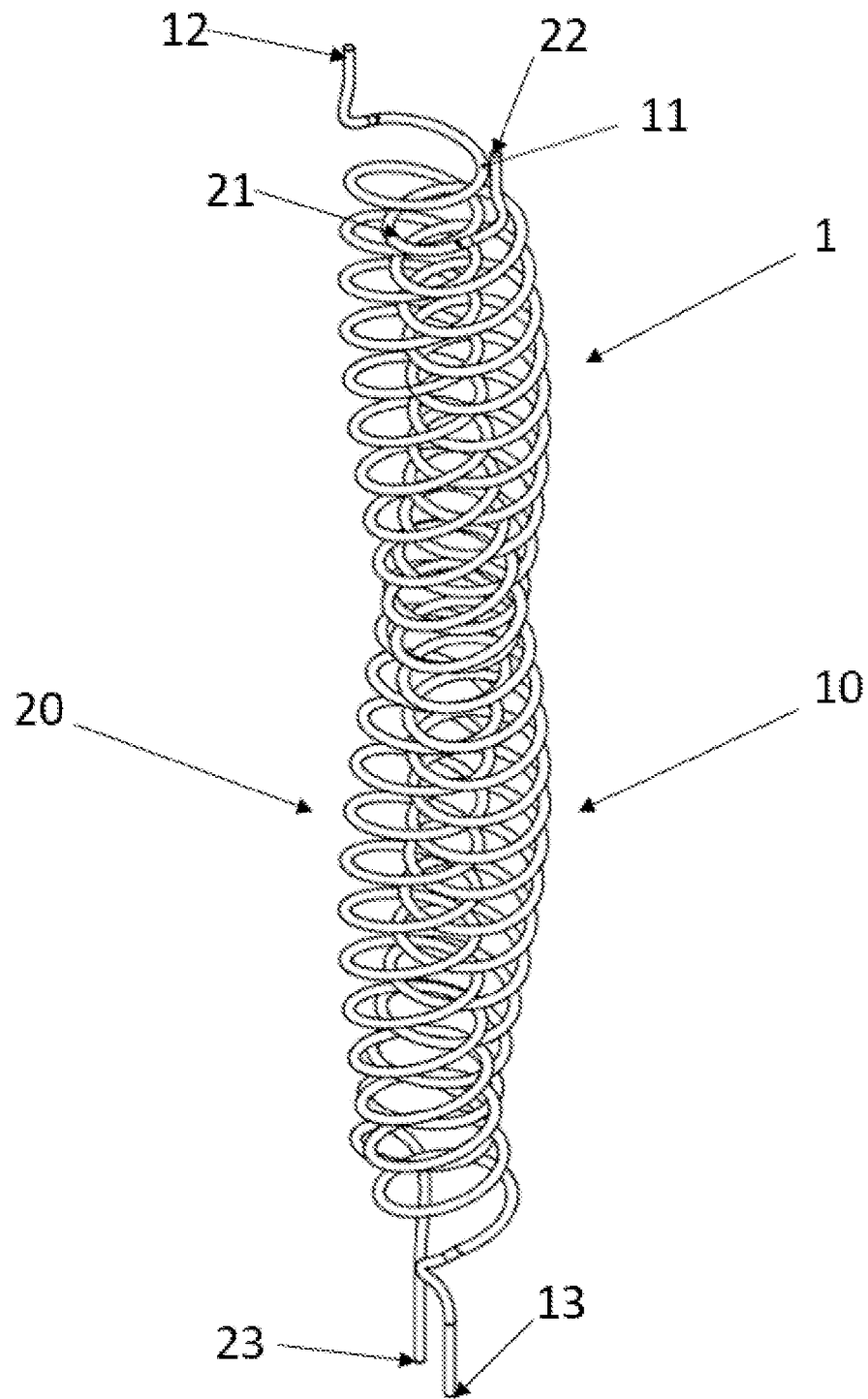
FIGS. 2A, 2B and 2C show isometric, side and top views respectively, of two intertwined helical tubular fluid channels of an exemplary heat exchanger of the present invention, having intertwined helical centre paths.
Figure 2B:
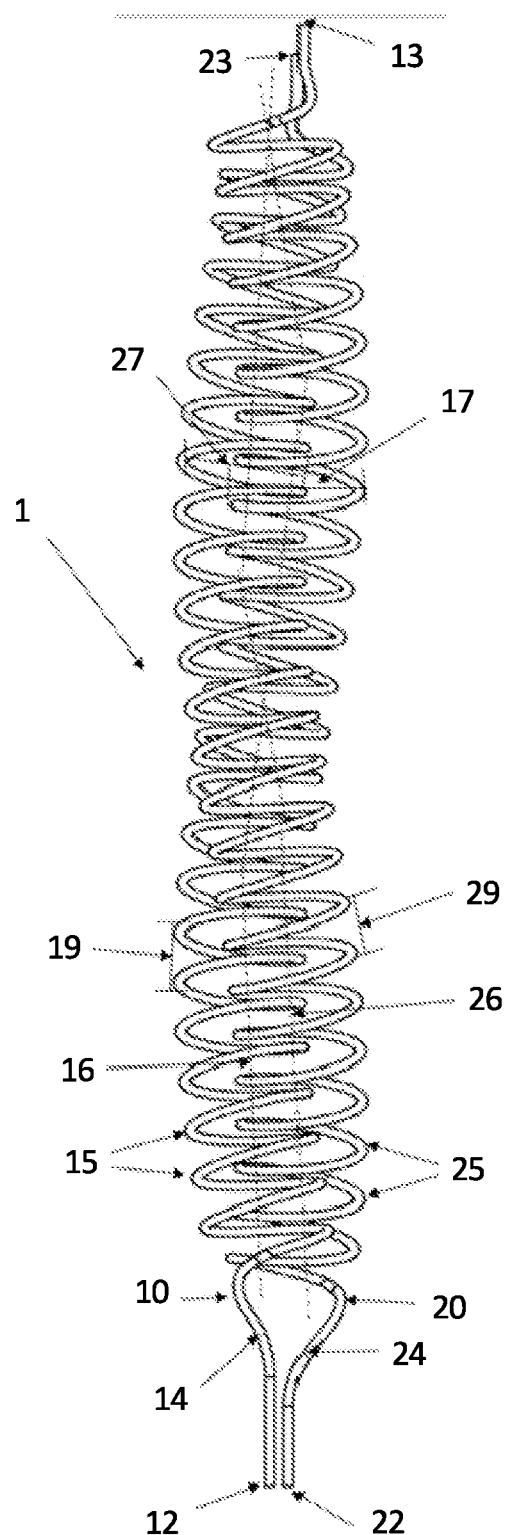
Figure 2C:
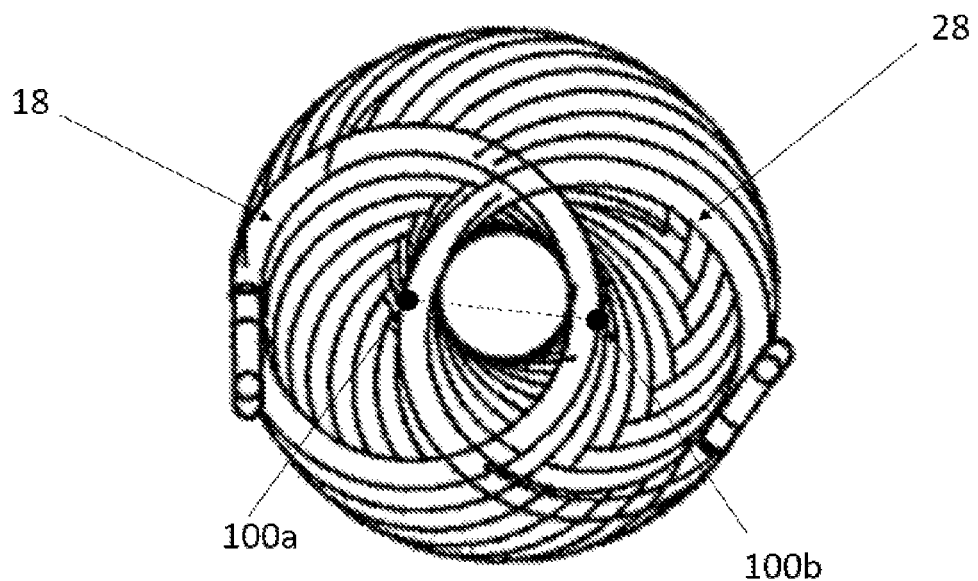
Figure 3A:
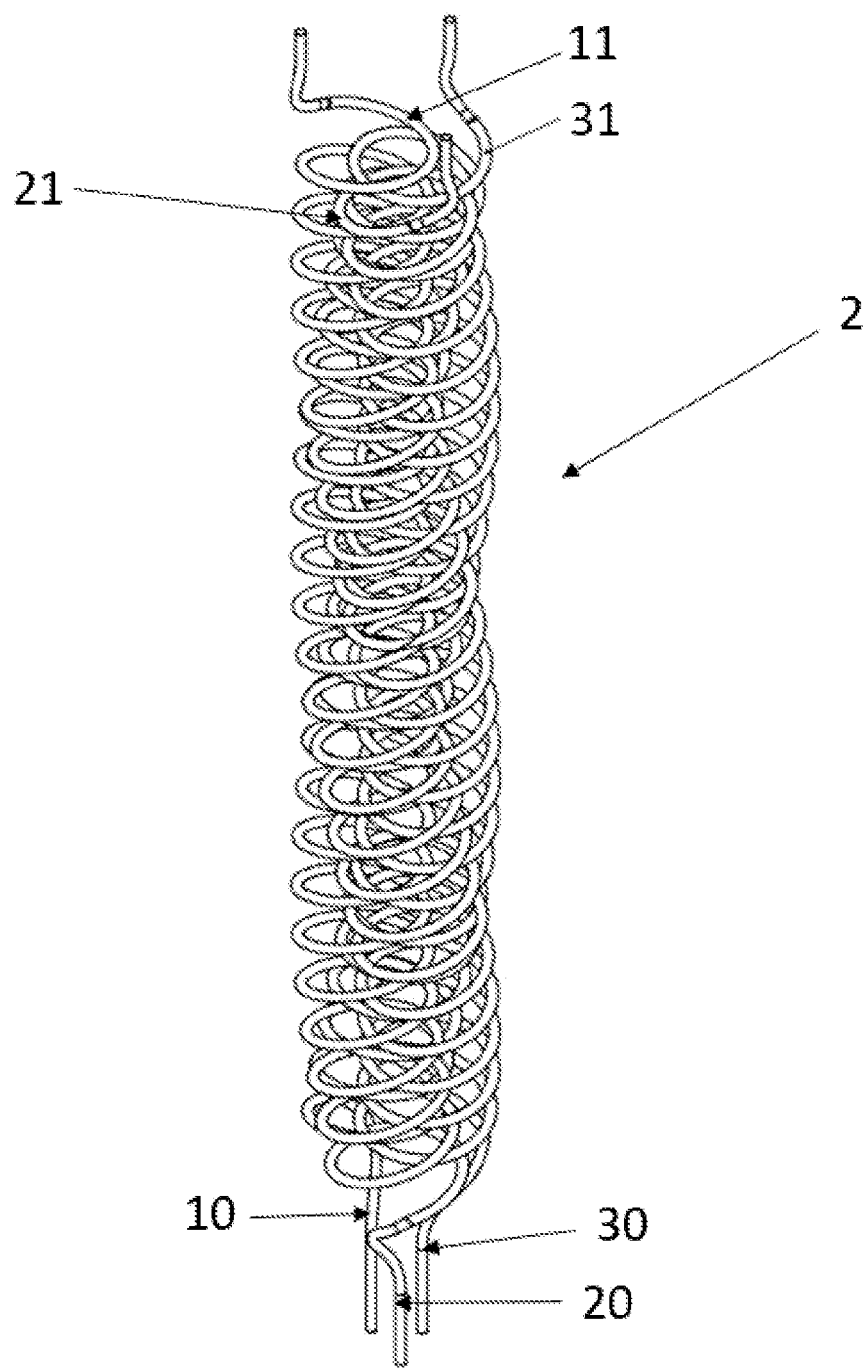
FIGS. 3A, 3B, 3C, and 3D show isometric, side, top and perspective views respectively, of an alternative exemplary embodiment of a heat exchanger of the present invention, having three tubular fluid channels forming intertwined helical coils and having intertwined helical centre paths.
Figure 3B:
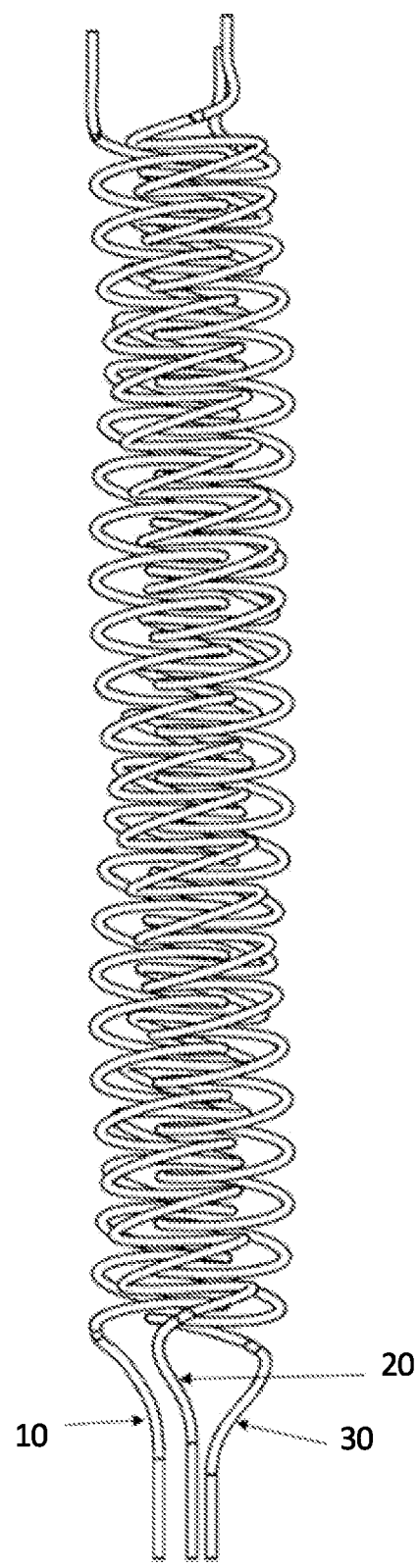
Figure 3C:
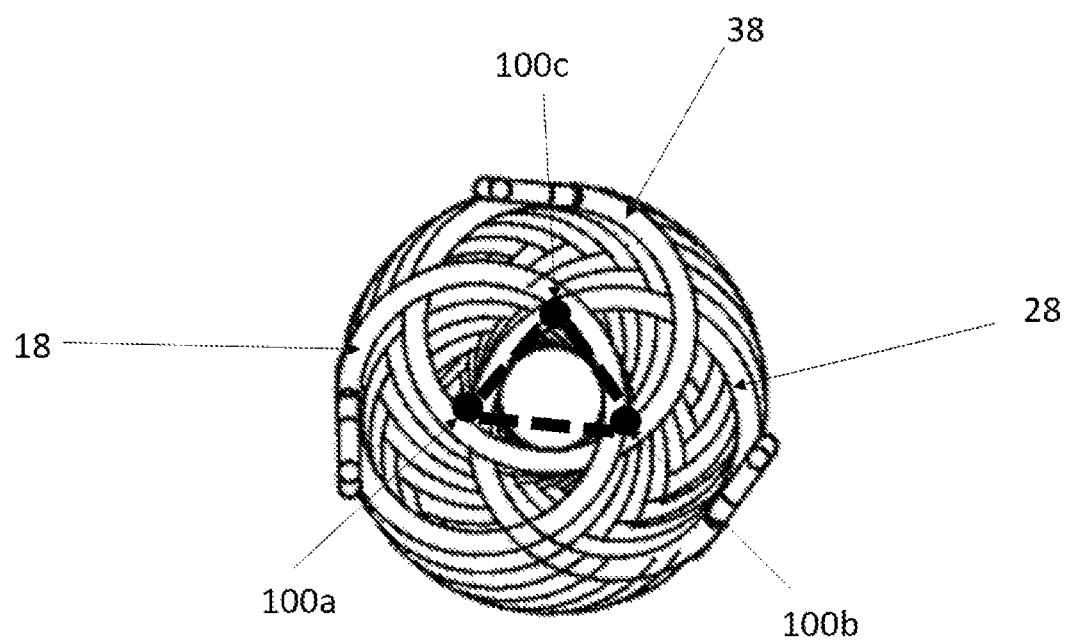
Figure 3D:
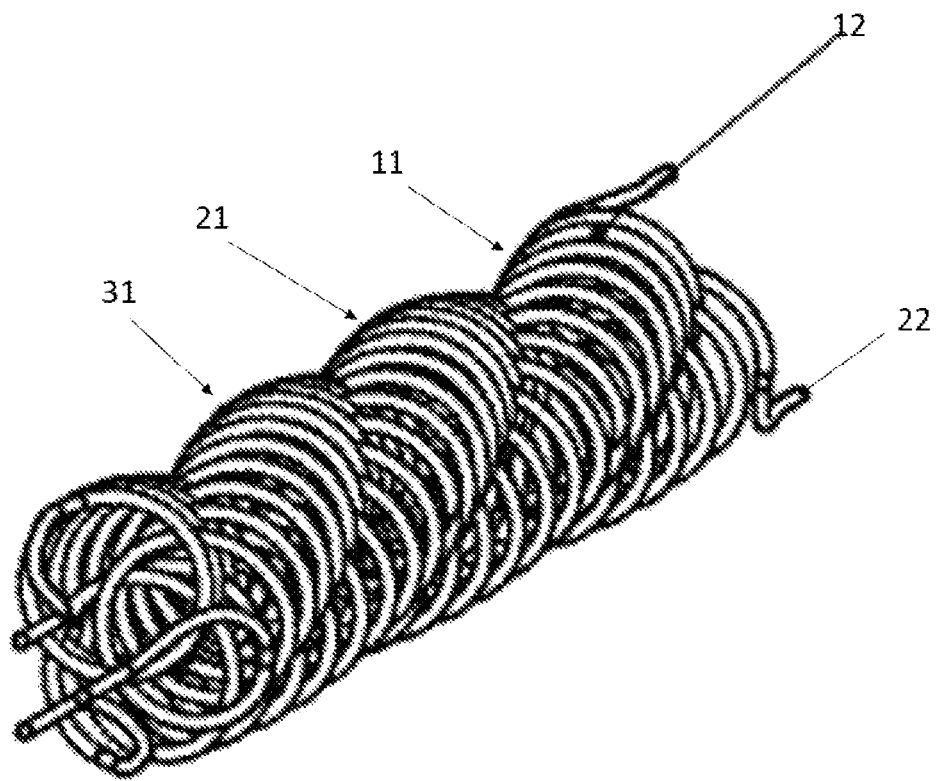

Reference is made to FIGS. 2A, 2B and 2C, showing isometric, side, and top view respectively, of two intertwined coils 11, 21 of two tubular fluid channels 10, 20 of an exemplary heat exchanger 1 of the present invention having two coils. Tubular fluid channel 10 and its respective helical coil 11 has been previously described in accordance with FIG. 1, and tubular fluid channel 20 has many similarities to helical fluid channel 10, but is positioned and twisted differently in space. Thus, tubular fluid channel 20 follows a unique trajectory, such that its centre path 26 is distant from the centre path 16 of coil 11. Each of the centre paths 16 and 26 forming a helix have essentially identical curvature along their lengths. The centremost longitudinal axis of the two-coiled heat exchanger is also encompassed within the inner volume of each of the coils.

As shown in FIG. 1, the tubular fluid channel 10 is formed as a helical coil 11 over the majority of its length. Likewise, the tubular fluid channel 20 is formed as a helical coil 21 over the majority of its length. The tubular fluid channel 20 has an external tubular diameter or equivalent diameter 24 of the same size as the diameter 14 of tubular fluid channel 10. As tubular fluid channel 10 has two openings 12 and 13, tubular fluid channel 20 has two openings 22 and 23 into the interior of the tubular fluid channel arranged at distant end positions of the fluid channel. The coil 11 is provided as a plurality of windings 15 with a pitch 19 being larger than the external tubular diameter 14, allowing for a space in between the windings to intertwine coil 21. The pitch may be equal to the external tubular diameter 14. Likewise, coil 21 has a plurality of windings 25 having a pitch 29 larger than the external diameter 24 to allow space for intertwining of coil 11. The coil 11 evolves with a centre path 16 forming a helix, and this helix intertwines with the centre path 26 of the coil 21. Just as coil 11 has encompassing diameter 17, coil 21 has an equivalent encompassing diameter 27.

It may be seen in FIG. 2C that planar representations 18 and 28 of windings of the coils 11 and 21 are circular and are of the same size, and are overlapping due to overlapping of adjacent coils. The centre points 100a of coil 11 and 100b of coil 21 of the circular planar representations of the windings form a straight line, shown in the drawing as a dashed line. Since the centre paths 16 and 26 are essentially the same, the amount of overlapping of the planar representations is the same along the length of the coils, such that the combined paths traversed by the two coils form an annular shape with a central circular space.

Reference is made to FIGS. 3A, 3B, 3C, and 3D showing an alternative exemplary implementation of a heat exchanger 2 of the present invention having three tubular fluid channels forming intertwined helical coils and having intertwined helical centre paths. The addition of a third coil further increases the surface area to optimize heat exchange. Coils 11 and 21 are intertwined as in FIG. 2, and now a third coil 31 of a third tubular channel 30 intertwines with coils 11 and 21. The centre points 100a, 100b, and 100c of the circular planar representations 18, 28, 38 of a winding of each of the coils form an equilateral triangle as shown by the dashed lines in FIG. 3C. Although these drawings shows three tubular fluid channels, alternative implementations may have any number of tubular fluid channels such as four, five or even six, with a planar representation of a winding of each coil overlapping with a planar representation of a winding of each of the other coils of the tubular fluid channels. Therefore, the shape formed by the centre points of the circular cross sections may vary according to the number of coils, and may be any symmetrical shape such as a regular polygon. It is noted that centre paths 16, 26 and 36 are not shown in this drawing to increase legibility of the drawing. The centre paths 16 and 26 are equivalent to those shown in FIG. 2B, and centre path 36 of coil 31 has a unique helical centre path that is distant from the centre paths 16 and 26 of the other two coils, and the centre paths 16, 26, 36, of the coils themselves are intertwined helixes. However, each of the centre paths 16, 26 and 36 have equivalent curvature to that of the other centre paths. As in FIGS. 2A to 2C, the centremost longitudinal axis of the heat exchanger is also encompassed within the inner volumes of every coil.

Figure 4:
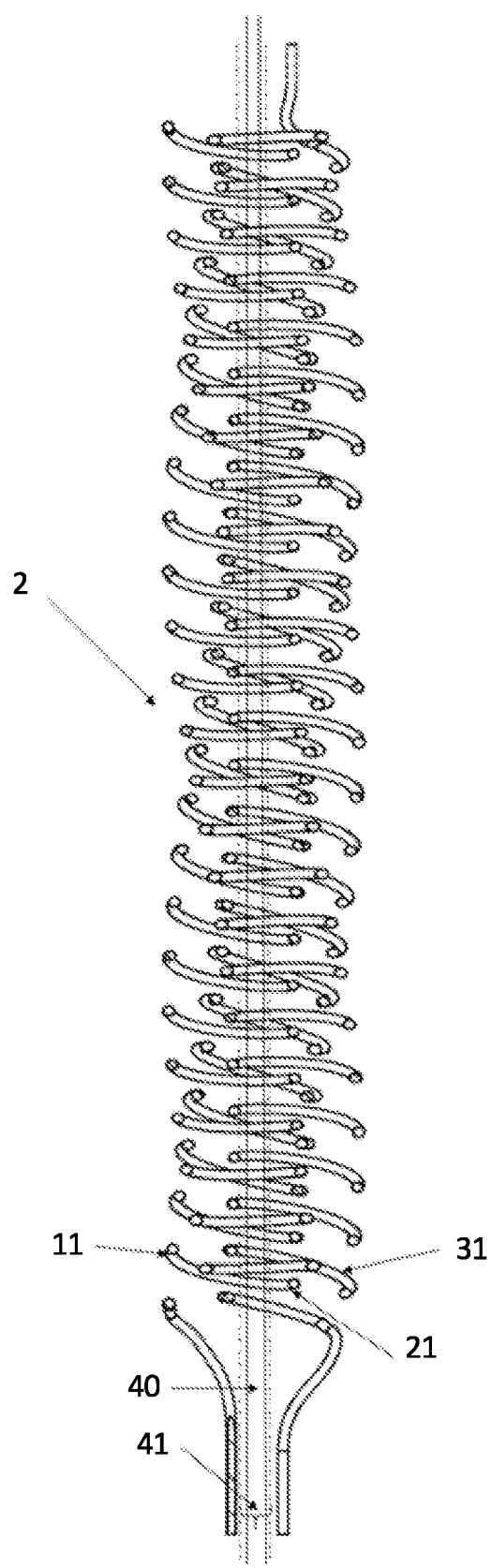
FIG. 4 shows a cross sectional (with ordinary hatching left to render the figure clearer) view of an alternative exemplary embodiment of the heat exchanger of the present invention, further comprising a non-coiled tubular fluid connection in a central space.

FIG. 4 shows an alternative exemplary embodiment of the heat exchanger 2 of the present invention, further comprising a non-coiled tubular fluid connection 40 in a central space 41. This drawing shows a heat exchanger having three tubular fluid channels 10, 20, 30 as in FIGS. 3A to 3D, but alternative embodiments of the present invention may have a non-coiled tubular fluid connection in combination with any number of coiled tubular fluid channels. The distance between the centre paths of the coils 11, 21, 31 has been selected to provide a substantially tubular, central space 41 extending throughout the inside of all the coils. The non-coiled tubular fluid connection 40 is linear and is arranged in the central space, and the coils 11, 21, 31 of the tubular fluid channels 10, 20, 30 twist around the non-coiled tubular fluid connection 40, with each of the coils overlapping with each of the other coils. However, although the coils twist "around" the non-coiled tubular fluid connection 40, it is important to note that the centre paths of the coils 11, 21, 31 each remain helical and unique. In this drawing the non-coiled tubular fluid connection 40 extends beyond the coils of the plurality of tubular fluid channels intertwined around one another, but in alternative embodiments of the present invention, the coils of the plurality of tubular fluid channels intertwined around one another extend beyond the non-coiled tubular fluid connection 40. The non-coiled tubular fluid connection has an opening at each of its distal ends that may function as an inlet or outlet for fluid. As in FIGS. 2A to 2C and 3A to 3D, the centremost longitudinal axis of the heat exchanger represented by the non-coiled tubular fluid connection is also encompassed within the inner volumes of every coil.

Figure 5:
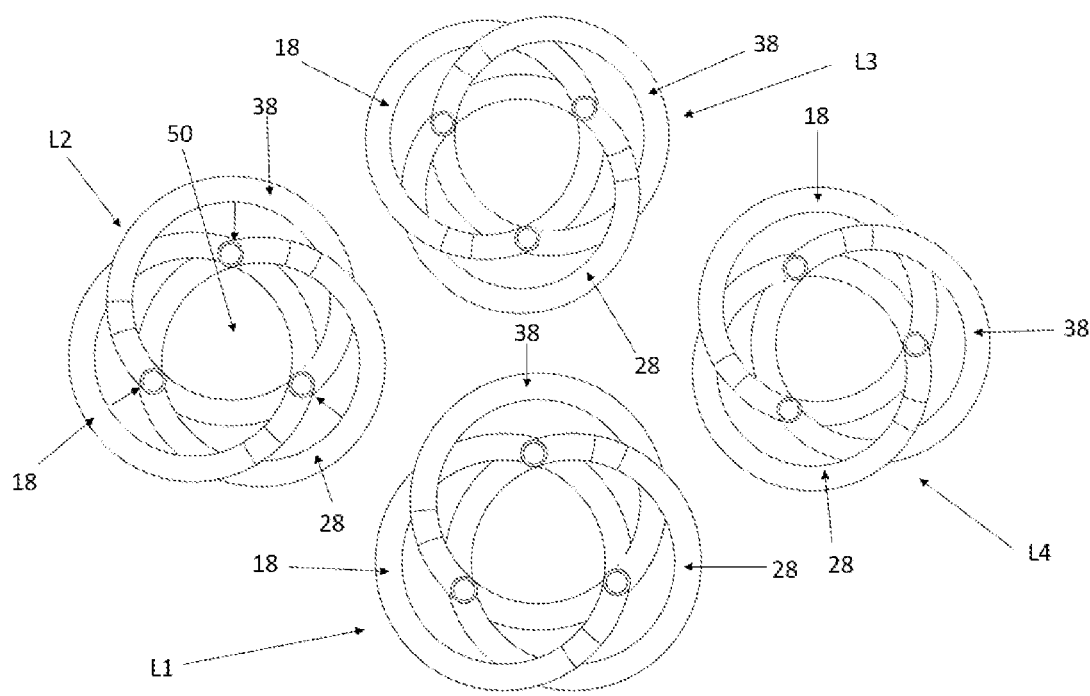
FIG. 5 shows multiple exemplary transverse circular cross sections of the heat exchanger of FIGS. 3A-3D having different orientations at different incremented positions along the length of the intertwined helical coils.
Figure 10:
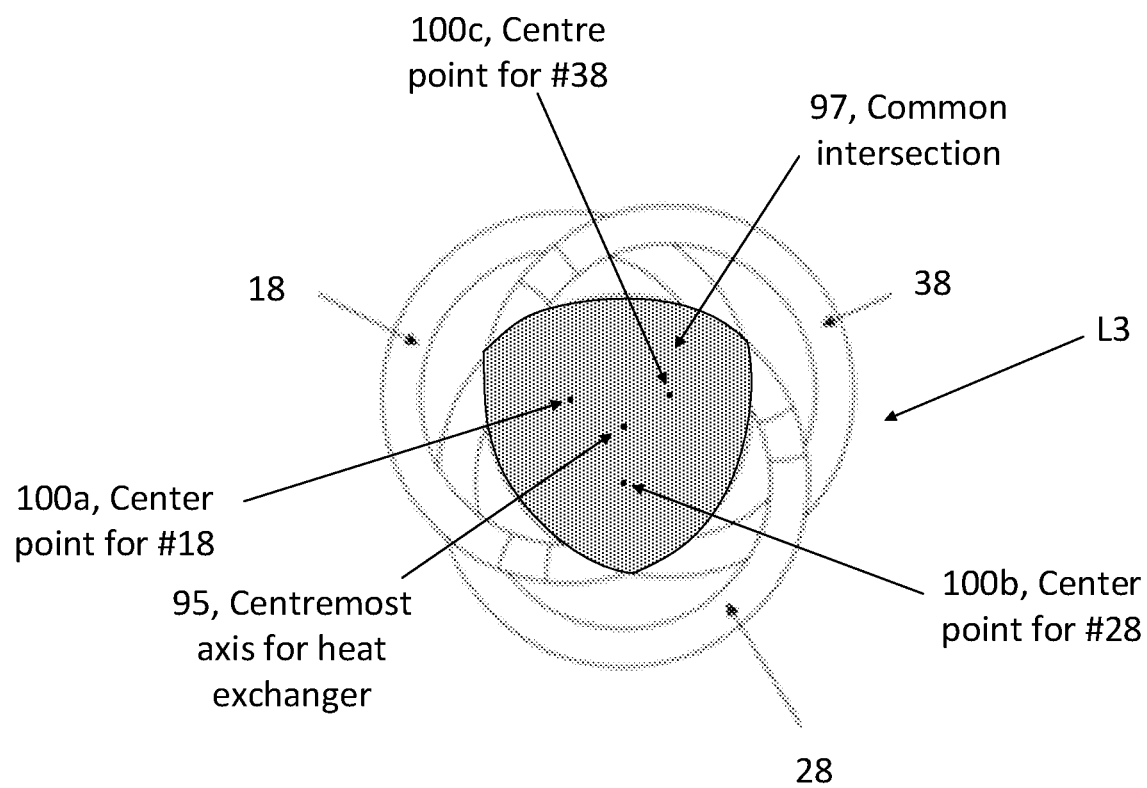
FIG. 10 illustrates the common intersection of planar representations.

Reference is now made to FIG. 5, showing multiple exemplary planar representations 18, 28, 38 of windings of the heat exchanger of FIGS. 3A to 3D, at different incremented positions along the length of the intertwined helical coils 11, 21, 31. Also in these figures, the overlapping of the windings is clearly seen. The orientation of the planar representations 18, 28, 38 of the windings of the coils may follow a repeating pattern along the length of coils. Here a planar representation is shown to be rotated incrementally clockwise from position along the length of the coils L1 to position L4, representing a twisting of the helical coils. As the planar representation is rotated while progressing down the length of the coils, the centre paths 16, 26 and 36 (not shown) each follow a unique curve while progressing downwards through depth L1, L2, L3, and L4. In this drawing, the overlap of the planar representations 18, 28, 38 of the windings in a single plane is symmetrical such that the centre points of the planar representations form an equilateral triangle, and the overlapping is shown to be equal at each of the levels L1 to L4, such that the centre section 50 is the same size at each depth. In alternative embodiments of the present invention, the amount of overlapping of the planar representations 18, 28, 38 of the windings may simultaneously follow a repeating pattern along the length of the coils while the orientation of the planar representations twist and/or follow a repeating pattern along the length of the coils. The centre section 50 of the planar representations of the coils, which is encircled by all three coils, may thus grow smaller at sections where the coils intertwine more, and larger as the intertwining becomes looser. Note that the planar representation of every coil overlaps each other coil and also the centremost axis of the heatexchanger. Furthermore, note that the center points 100 of each and every winding all fall within the planar representation of each winding. This is shown in FIG. 10 illustrating the center points 100, the centremost axis 95 of the heat exchanger 1 and the common intersection 97 for the embodiment shown in FIG. 5 (L3). As illustrated, all the planar representations overlap each other defining an common intersection. The heat exchanger is furthermore designed so that centremost axis 95 is located inside, preferably in the center, of the common intersection 97. The common intersection 97 is defined as the overlap in common for all the planar representation.

Figure 6:
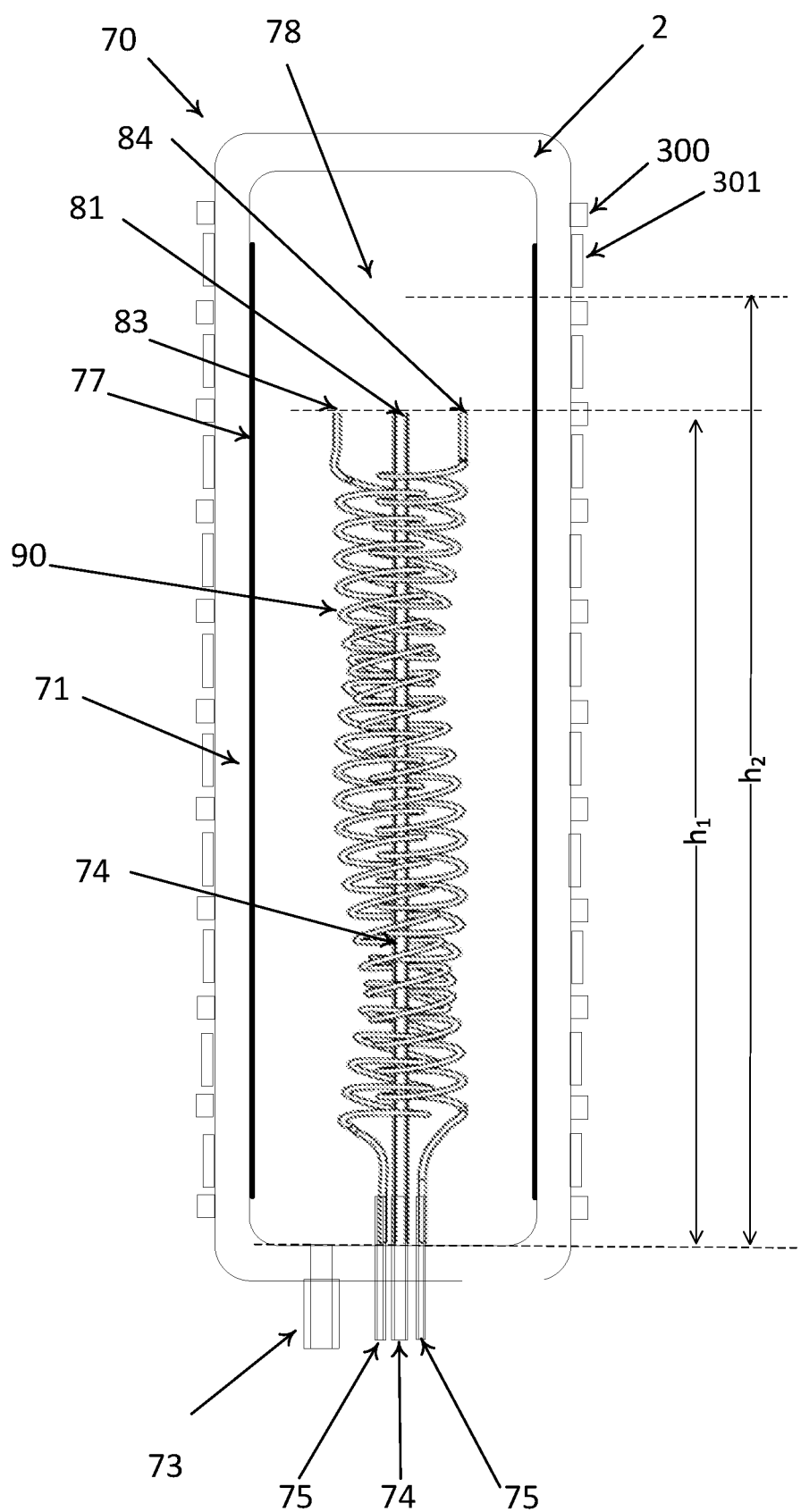
FIG. 6 shows an exemplary supercritical water oxidation reactor according to the present invention, enclosing an alternative embodiment of a heat exchanger of the present invention.

FIG. 6 shows an exemplary supercritical water oxidation reactor 70 according to the present invention enclosing a heat exchanger 90 according to a further exemplary implementation of the present invention. The super critical water oxidation (SCWO) reactor 70 comprises a reactor wall 71 formed of a thickness and material configured to withstand pressure and temperature in the supercritical region of water, and a heat exchanger 90 enclosed in the interior of the reactor enclosure 78. The heat exchanger 90 may function as a distillate output connection and has an equivalent intertwined helical coil structure to that described in accordance with FIGS. 2A to 2C. The openings 83, 84 function as inlets (or outlets) for fluid into (out from) the heat exchanger 90. Each tubular channel has an opening at the end position distant from openings 83, 84, from which fluid may proceed to a single straight section extending to the outside of the SCWO-reactor and forming the outlet 75. For example, the openings 81, 83, 84 may function as distillate inlets for removing supercritical fluid from the reactor 70. This may be accomplished by arranging one or more openings 81, 83, 84 at a height in the reactor corresponding to a supercritical region of fluid. Although it is not shown in this drawing, the reactor 70 may further comprise a residue outlet at the critical point or in the subcritical region of fluid that is configured to extract residue, such as salt, from the reactor. The residue output connection 74 may be arranged inside heat exchanger 90 and the inlet 81 of the residue output connection 74 is arranged at a vertical height $h_1$ which may be below the position of the critical point during normal operation. For embodiments of the reactor lacking a residue outlet, residue or pollutants may accumulate inside the reactor and then be rinsed out of the reactor periodically. Pretreatment of fluid, such as wastestreams, may also facilitate reducing accumulation of the residue or pollutants within the reactor. According to alternative embodiments of the present invention, any of the heat exchangers described herein may be incorporated into such a supercritical water oxidation reactor, including those having two, three, or more tubular fluid channels.

The reactor further comprises one or more reactor fluid connections 73 (one is illustrated) extending into the reactor enclosure for introducing fluid into, or extracting fluid from, the reactor enclosure 78. Alternative embodiments of reactors of the present invention may have other numbers of reactor fluid connections, but have at least one.

The position of the critical point (salt mirror position) above which the fluid is super critical and below which the fluid is sub critical is not illustrated in FIG. 6. The reactor may comprise a plurality of heating and cooling elements 300 on the reactor wall for controlling the level of the supercritical point of the fluid in reference to the height of the heat exchanger. The reactor may also comprise a number of thermal elements 301 configured for sensing the temperature at their location, which may be used as an estimate for the temperature of the fluid inside the reactor 70 at the position of the thermal element 301.

The heat exchanger 90, which may function as the distillate output connection, is also arranged inside the inner liner 77 with its openings 83 and 84 arranged at the vertical height $h_1$. The heat exchanger is provided with a substantially tubular, central space extending through-out the inside of the coils formed by channels 91, 92. The residue output connection as a tubular connection may be arranged in this space and may be coiled or non-coiled. The heat exchanger comprises a section of two intertwined helical coils. At the bottom of the SCWO-reactor 70, the coiled section of the heat exchanger 90 proceeds into two outlets that may lead fluid toward a straight section extending to the outside of the SCWO-reactor and forming the distillate outlet 75 of the heat exchanger 90.

Figure 7:
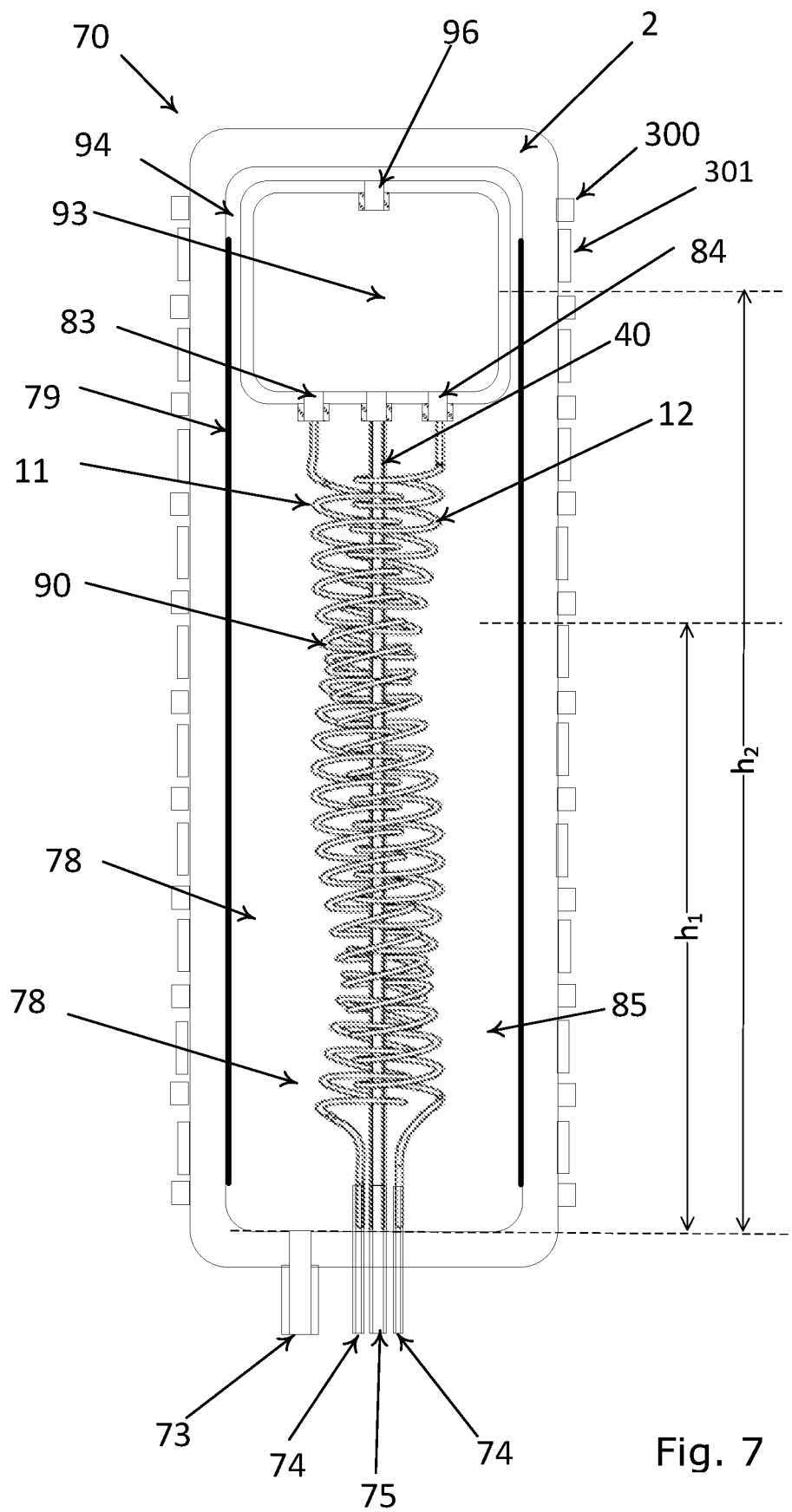
FIG. 7 shows an alternative exemplary supercritical water oxidation reactor according to the present invention, having an upper oxidation chamber.

During normal operation, the aqueous liquid is fed into the reactor 70 through the aqueous fluid inlet connection 73 and enters thereby into the inner cavity 78. The aqueous fluid is heated (or cooled) by the thermal elements 301 and/or by the fluid flowing downwardly inside the heat exchanger 90 and by the fluid flowing downwardly inside the residueoutput connection 74. As described herein, the aqueous fluid may be heated so that the fluid becomes critical at a vertical position above $h_1$ and below $h_2$ thereby produces a residue flowing into the residue output connection 74. The distillate (produced by the fluid becomes super critical) moves upwardly in the super critical region. The distillate has two flow paths out of the SCWO-reactor 70 namely through the heat exchanger 90 and through the residue output connection 74. It is noted, that the flow path through the heat exchanger 90 is discussed as one flow path although it has as shown in FIG. 7 two tubular flow channels, to allow the flow path to be discussed as one flow path also in embodiments where the heat exchanger comprising more than two tubular flow channels, such as three or more.

Further, although FIG. 6 discloses the inlets 83, 84 of the heat exchanger 90 and the inlet 81 of the residue output connection 74 as located at the same height, the invention is not limited to such configuration. Within the scope of the present invention are also embodiments in which the various inlets of the heat exchanger are located at the same or different vertical positions and the inlet 81 of the residue output connection may be located at yet other vertical position than the inlets of the heat exchanger 90.

The reactor may also comprise one or more salt filters and/or one or more catalysts, which may be arranged in front of and/or below the inlets 83 and 84 of the heat exchanger 90 and/or in front of the inlet 81 of the residue output connection 74. "In front of" refers to a position where fluid flow through the salt filter and/or contacts the catalyst(s) prior to flow into the element in question. The salt filter may for example be in the form of or comprising a screen, a cyclone, a moving bed filter, a plate filter or combinations thereof. The catalyst(s), if implemented, may preferably be selected from the group catalysts enhancing the oxidation process(es) in the reactor In any of the embodiments of the present invention, a catalyst may arranged in front of and/or below the inlets 83 and 84 of the heat exchanger 90 in a manner so that fluid leaving the reactor through inlets 83 and 84 comes into contact with the catalyst. The catalyst is typically a heterogeneous catalyst, e.g. in the form of pellets or a porous structure providing a flow path past the catalyst towards the inlets 83 and 84. Alternatively, or in combination thereto, the catalyst may be applied to surfaces of a flow structure e.g. a filter. The catalyst being selected from the group catalysts enhancing the oxidation process(es) in the reactor.

In addition, the embodiment shown in FIG. 6 may also comprise an oxidation fluid input connection (not illustrated). A Salt concentration sensor may also be arranged to measure the salt concentration in the residue and/or distillate (as disclosed herein).

In embodiments having the distillate output connection formed as a plurality of intertwined helical coils, there may be multiple parallel residue output connections. Alternatively, in embodiments having the residue output connection formed as a plurality of intertwined helical coils, there may be multiple parallel distillate output connections.

Figure 8:
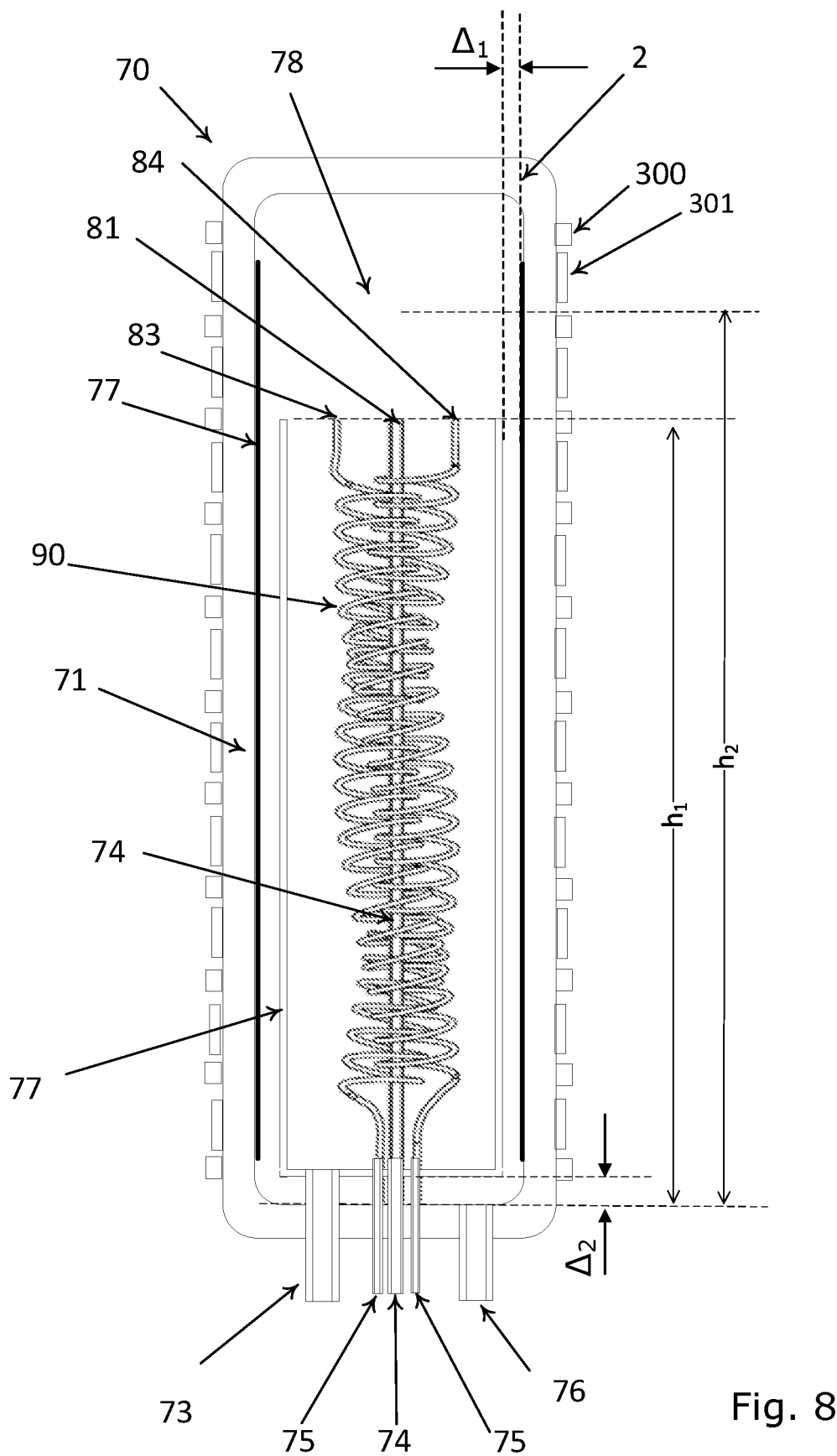
FIG. 8 shows an exemplary supercritical water oxidation reactor according to the present invention, including a loose liner.
Figure 9:
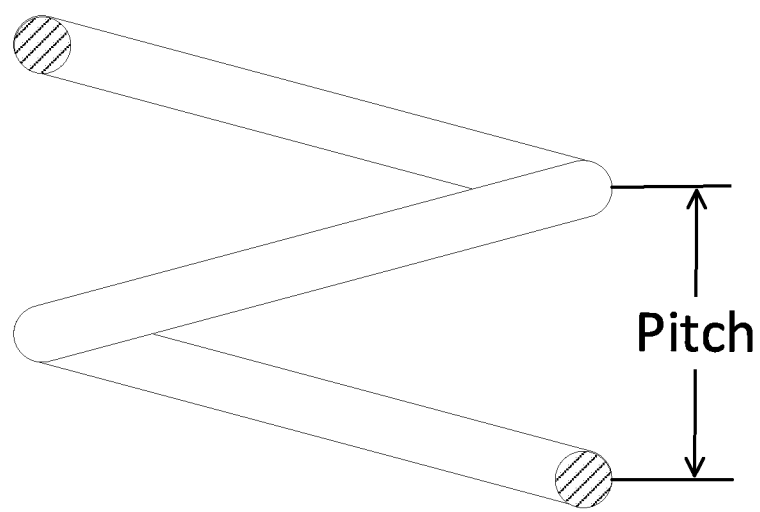
FIG. 9 illustrates schematically one winding of a coil as described herein with the indication of the distance pitch.

FIG. 7 shows an alternative exemplary supercritical water oxidation reactor 70 according to the present invention, having an upper oxidation chamber 93 within the reactor enclosure 78. Since the upper oxidation 70 chamber occupies the majority of the volume of the reactor enclosure 78 above the heat exchanger 1, the upper oxidation chamber 93 forces most of the oxidation reactions of the fluid to take place inside this chamber, as most of the residence time during oxidation will occur inside this chamber 93. Thus, any corrosive compounds released during the oxidation process will most likely occur inside the upper oxidation chamber 93, as opposed to within the reactor enclosure 78 outside this chamber, minimizing corrosion to inside surface of the reactor wall. In embodiments having a liner 79 such as shown in FIG. 8, corrosion is minimized to the liner as well. In this drawing the upper oxidation chamber occupies at least 80 percent of the volume of the reactor enclosure 78 above the heat exchanger 1, but in alternative embodiments of the present invention the upper oxidation chamber may occupy at least, 60, 70, 80 or 90 percent of the volume of the reactor enclosure 78 above the heat exchanger 90.

The intertwined helical coil heat exchanger 90 according to FIGS. 2A to 2C is located beneath the upper oxidation chamber 93, and the upper oxidation chamber is in fluid connection with the two tubular fluid channels of the heat exchanger and their respective coils 11 and 21. In addition to having the two helical coils 11 and 21, the heat exchanger has a non-coiled central tubular fluid connection 40 in a central space 41 as described in accordance with FIG. 4, forming the outlet 75. This outlet 75 may alternatively be used as an inlet by reversing the flow direction.

The aqueous fluid inlet connection 73 allows fluid to enter the reactor, while reactor fluid connections 74 and 75 function as dedicated outlets, either for distillate or residue. It is noted, that the flow direction may be reversed. Fluid enters the reactor 70 through the aqueous fluid inlet connection 73 and proceeds upwards through a small space 94 between the upper oxidation chamber 93 and the reactor enclosure 78. The fluid then enters through one or more openings 96 in the top of the upper oxidation chamber 93 and travels downward through the upper oxidation chamber and into the openings 83 and 84 at the distal ends of the coils 11 and 12 of the heat exchanger 90. The distillate and/or residue then exit the reactor through the outlets 74, 75 and 76. Although the heat exchanger 90 shown in this drawing has two helical coiled tubular fluid channels, alternative reactors of the present invention may comprise any of the heat exchangers described herein, such as those having more than two tubular fluid channels and those having more than two intertwined helical coils. The reactor 70 may further comprise heating and cooling elements 300 as well as thermal elements such as those described in accordance with FIG. 6.

Also in the embodiment shown in FIG. 7, salt filters and/or catalyst(s) as disclosed e.g. in relation to FIG. 7 may be implemented. For instance a salt filter and/or catalyst may be arranged in front of the one or more openings 96 in the top of the upper oxidation chamber 93 and/or in front of the openings 83 and/or 84 as well as in front of the opening leading into the central tubular fluid connection 40. In a further embodiment, the cavity forming the upper oxidation chamber 93 may be occupied by a salt filter and/or catalyst.

FIG. 8 illustrates the reactor as illustrated in FIG. 6 further including a loose liner 77 arranged inside the reactor enclosure 78 and a further inlet/outlet 76. The loose liner 77 is an open-ended cavity with the open end facing towards the upper end of the reactor. The loose liner 77 is reference "loose" as it forms an elements that is not attached to the inner side wall of reactor. Further, in some embodiments, the loose liner 77 is a replaceable element, such as a service part.

As illustrated in FIG. 8, a space $\Delta_1$, $\Delta_2$ between the loose liner 77 and the reactor wall 71 is in direct fluid connection with the reactor fluid connection 76.

Depending on the use of the reactor fluid may flow up or down in the space defined between the reactor wall 71 and the loose liner 77.

It is furthermore noted, that although FIG. 8 illustrates the liner 79, this part (as in embodiments like FIGS. 6 and 7) is optional. Further, the loose liner 77 may also be applied to other embodiments like the one disclosed in FIG. 7.

In other embodiments, the space $\Delta_1$, $\Delta_2$ between the loose liner 77 and the reactor wall 71 is in fluid connection with at least one of the tubular fluid channels of the heat exchanger 90; in the embodiment shown in FIG. 8, the tubular fluid channels of the heat exchanger extend outside the reactor.

In the following preferred embodiments are presented as an itemized list:

Item 1. A heat exchanger (1) comprising:
a plurality of tubular fluid channels (10, 20, 30) each having:
an external tubular diameter (14, 24) or equivalent diameter;
two openings (12, 13, 22, 23) into the interior of the tubular fluid channel, said openings being arranged at distant end positions of the fluid channel;
wherein
each of the plurality of tubular fluid channels (10, 20, 30) are formed as a coil (11, 21, 31), such as a helical coil (11, 21, 31), over at least a part of their lengths, each coil (11, 21, 31) being provided as a plurality of windings (15, 25) each of said coils (11, 21, 31) evolving with a centre path (16, 26, 36);
the coils (11, 21, 31) of the plurality of tubular fluid channels (10, 20, 30) are intertwined around one another with the centre path (16, 26, 36) of each coil being distant from the centre path (16, 26, 36) of the other coils (11, 21, 31), and each of the centre paths (16, 26, 36) forms a helix.

Item 2. A heat exchanger (1) according to item 1, wherein the helical centre paths (16, 26, 36) of said coils (11, 21, 31) are intertwined.

Item 3. A heat exchanger (1) according to either of items 1 or 2, wherein a planar representation (18, 28, 38) of a winding of each of said coils 11, 21, 31 of the tubular fluid channels (10, 20, 30) is circular.

Item 4. A heat exchanger (1) according to item 3, wherein the centre points (100a, 100b, 100c) of the circular cross sections (18, 28, 38) of said coils (11, 21, 31) form a symmetrical shape or a straight line.

Item 5. A heat exchanger (1) according to either of items 3 or 4, wherein said each of said centre paths (16, 26, 36) forming a helix has essentially identical curvature.

Item 6. A heat exchanger (1) according to item 4, wherein said symmetrical shape is an equilateral triangle or a regular polygon.

Item 7. A heat exchanger (1) according to any of the preceding items, wherein the plurality of tubular fluid channels (10, 20, 30) is two, three, four, five or even six.

Item 8. A heat exchanger (1) according to any of the previous items, wherein the tubular fluid channels (10, 20, 30) are formed as coils (11, 21, 31) over at least sixty percent of their lengths.

Item 9. A heat exchanger (1) according to any of the preceding items, wherein the external tubular diameter (14, 24) of each tubular fluid channel (10, 20, 30) is between 15.0 mm and 3 mm, such as between 10.0 mm and 5.0 mm.

Item 10. A heat exchanger (1) according to any of the preceding items, wherein the encompassing diameter (17, 27) of each coil of the plurality of tubular fluid channels (10, 20, 30), being provided as a plurality of windings (15, 25), is between 200.0 mm and 20.0 mm, such as between 100.0 mm and 50.0 mm.

Item 11. A heat exchanger (1) according to any of the preceding items, wherein the number of said plurality of windings (15, 25) of each coil (11, 21, 31) is larger than 10, such as larger than 30, preferably larger than 40 and smaller than 50.

Item 12. A heat exchanger (1) according to any of the preceding items, wherein each coil (11, 21, 31) of said tubular fluid channels (10, 20, 30) is substantially identical to the other coils (11, 21, 31).

Item 13. A heat exchanger (1) according to any of the preceding items, wherein each of the plurality of tubular fluid channels (10, 20, 30) is made from metal.

Item 14. A heat exchanger (1) according to any of the preceding items, wherein the distance between the centre paths (16, 26, 36) of said coils (11, 21, 31) is selected to provide a substantially tubular, central space (41) extending through-out the inside of all of the coils (11, 21, 31).

Item 15. A heat exchanger (1) according to item 14, further comprising at least one non-coiled tubular fluid connection (40) arranged in said substantially tubular, central space (41), and wherein said coils (11, 21, 31) of the plurality of the fluid channels (10, 20, 30) twist around said non-coiled tubular fluid connection (40).

Item 16. A heat exchanger according to item 15, wherein said at least one non-coiled tubular fluid connection (40) extends beyond the coils (11, 21, 31) of the plurality of tubular fluid channels (10, 20, 30) intertwined around one another.

Item 17. A heat exchanger according to item 15, wherein the coils (11, 21, 31) of the plurality of tubular fluid channels intertwined around one another extend beyond said at least one non-coiled tubular fluid connection (40).

Item 18. A heat exchanger according to any of the preceding items, wherein each coil (11, 21, 31) being provided as a plurality of windings (15, 25) with a pitch (19, 29) being equal to or larger than its said external tubular diameter (14, 24).

Item 19. A heat exchanger according to any of the preceding items, wherein adjacent winding of the coils overlap at least along a part of the coils.

Item 20. A heat exchanger according to any of the preceding items 1-17, wherein each coil (11, 21, 31) being provided as a plurality of windings (15, 25) with a pitch (19, 29) being less than twice the diameter its said external tubular diameter (14, 24).

Item 21. A heat exchanger according to any of the items 1-18 or 20, wherein adjacent winding of the coils do not overlap at least along a part of the coils.

Item 22. A reactor (70) for supercritical water oxidation, said reactor comprising:
a reactor wall (71) forming a reactor enclosure (78), said reactor wall (71) configured to withstand pressure and temperature in the supercritical region of water,
a heat exchanger (1), according to any of the preceding items, enclosed in the interior of said reactor enclosure (78).

Item 23. A reactor (70) according to item 22, wherein said reactor (70) further comprises at least one reactor fluid connection (73, 74, 75, 76) extending into the reactor enclosure (78) for introducing fluid into, or extracting fluid from, said reactor enclosure (78).

Item 24. A reactor (70) according to item 23, wherein at least one of said reactor fluid connections (73, 74, 75, 76) is fluidly connected to said plurality of tubular fluid channels (10, 20, 30).

Item 25. A reactor (70) according to any of items 22 to 24, wherein said reactor (70) further comprises a plurality of heating and cooling elements (300) on said reactor wall (71) for controlling the level of the supercritical point of said fluid (80) in reference to the height of the heat exchanger (1).

Item 26. A reactor (70) according to any of items 22 to 25, further comprising a loose liner (77) in said reactor enclosure (78).

Item 27. A reactor (70) according to item 26, wherein a space ($\Delta_1, \Delta_2$) between said loose liner (77) and said reactor wall (71) is in fluid connection with at least one of said reactor fluid connections (73, 74, 75, 76).

Item 28. A reactor (70) according to either of items 26 or 27, wherein a space ($\Delta_1, \Delta_2$) between said loose liner (77) and said reactor wall (71) is in fluid connection with at least one of said tubular fluid channels (10, 20, 30, 40).

Item 29. A reactor (70) according to any of items 22 to 28, wherein said reactor (70) further comprises an upper oxidation chamber (93) within said reactor enclosure (78) that is in fluid connection with said plurality of tubular fluid channels (10, 20, 30), said heat exchanger (1) being located beneath said upper oxidation chamber (93).

Item 30. A reactor (70) according to item 29, wherein said upper oxidation chamber (93) occupies at least seventy, such as eighty percent of the volume of said reactor enclosure (78) above said heat exchanger (1).

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Further, "helix" and "helical" as used herein are preferably to be understood in broad terms and preferably not being limited to a mathematical definition. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:
1. A heat exchanger comprising:
a plurality of tubular fluid channels each having:
an external tubular diameter or equivalent diameter;
two openings into the interior of the tubular fluid channel, said openings being arranged at distant end positions of the fluid channel;
wherein
each of the plurality of tubular fluid channels are formed as a helical coil, over at least a part of their lengths, each coil being provided as a plurality of windings, each of said coils evolving with a centre path;
the coils of the plurality of tubular fluid channels are intertwined around one another with the centre path of each coil being distant from the centre path of the other coils, and each of the centre paths forms an intertwined helix, and;
in a transverse cross section of the heat exchanger, a planar representation of a winding of a first of said coils overlaps a planar representation of a winding of each of the other said coils of said plurality of tubular fluid channels;
wherein the distance between the centre paths of said coils is selected to provide a substantially tubular, central space extending through-out the inside of all of the coils; and
further including at least one non-coiled tubular fluid connection arranged in said substantially tubular, central space, and wherein said coils of the plurality of the fluid channels twist around said at least one non-coiled tubular fluid connection.

2. The heat exchanger according to claim 1, wherein the planar representation of the winding of each of said coils of the tubular fluid channels is circular.

3. The heat exchanger according to claim 1, wherein in, each and every of, said transverse cross sections of the heat exchanger, a centremost axis of the heat exchanger is encompassed by the planar representation of the winding of each, and every, of said coils of said plurality of tubular fluid channels.

4. The heat exchanger according to claim 1, wherein all the planar representations of the coils have a common intersection, whereby a centre point of each planar representation being fully within the common intersection, and with a centremost axis of the heat exchanger being within the common intersection.

5. The heat exchanger according to claim 1, wherein said planar representation of the winding of the first of said coils encompasses the centre path of each of the other coils.

6. The heat exchanger according to claim 1, wherein an amount of overlap of said planar representation of the winding of the first of said coils with each said planar representation of the winding of each of the other said coils is essentially equal.

7. The heat exchanger according to claim 6, wherein said amount of overlap of said planar representation of the winding of the first of said coils with each said planar representation of the winding of each of the other said coils is at least 30% of a total area of the planar representation of the winding of the first of said coils and less than 90%.

8. The heat exchanger according to claim 1, wherein the centre path of at least one of said coils is helical and completes at least one full revolution, traversing at least 360 degrees as the centre path proceeds longitudinally through the windings of each of said at least one coil.

9. The heat exchanger according to claim 1, wherein an amount of overlapping of the planar representations of the windings of the coils is substantially the same along the length of the coils.

10. The heat exchanger according to claim 1, wherein the number of said plurality of windings of each coil is larger than 10 and less than 200.

11. The heat exchanger according to claim 2, wherein the planar representations of said coils include centre points that form a symmetrical shape or a straight line.

12. The heat exchanger according to claim 2, wherein said each of said centre paths that form the helix has essentially identical curvature.

13. The heat exchanger according to claim 11, wherein said symmetrical shape is either an equilateral triangle or a regular polygon.

14. The heat exchanger according to claim 1, wherein the plurality of tubular fluid channels is two, three, four, five or six.

15. The heat exchanger according to claim 1, wherein the tubular fluid channels are formed as coils over at least sixty percent of their lengths.

16. The heat exchanger according to claim 1, wherein said each of said tubular fluid channels have the external tubular diameter between 3 mm and 15.0 mm.

17. The heat exchanger according to claim 1, wherein an encompassing diameter of each coil of the plurality of tubular fluid channels is between 20.0 mm and 200.0 mm.

18. The heat exchanger according to claim 1, wherein the number of said plurality of windings of each coil is larger than 30 and smaller than 200.

19. The heat exchanger according to claim 1, wherein each coil of said tubular fluid channels is substantially identical to the other coils.

20. The heat exchanger according to claim 1, wherein each of the plurality of tubular fluid channels is made from metal.

21. The heat exchanger according to claim 1, wherein said at least one non-coiled tubular fluid connection extends beyond the coils of the plurality of tubular fluid channels intertwined around one another.

22. The heat exchanger according to claim 1, wherein the coils of the plurality of tubular fluid channels intertwined around one another extend beyond said at least one non-coiled tubular fluid connection.

23. The heat exchanger according to claim 1, wherein the plurality of tubular fluid channels each having the external tubular diameter, and wherein the plurality of windings of each coil have a pitch being larger than its said external tubular diameter.

24. The heat exchanger according to claim 1, wherein adjacent winding of the coils overlap at least along a part of the coils.

25. The heat exchanger according to claim 1, wherein the plurality of tubular fluid channels each having the external tubular diameter, and wherein the plurality of windings of each coil have a pitch being less than twice its said external tubular diameter.

26. The heat exchanger according to claim 1, wherein adjacent winding of the coils do not overlap at least along a part of the coils.

27. A reactor for supercritical water oxidation, said reactor comprising:
    a reactor wall forming a reactor enclosure, said reactor wall configured to withstand pressure and temperature in the supercritical region of water, and
    a heat exchanger enclosed in the interior of said reactor enclosure, the heat exchanger including:
        a plurality of tubular fluid channels each having:
            an external tubular diameter or equivalent diameter;
            two openings into the interior of the tubular fluid channel, said openings
            being arranged at distant end positions of the fluid channel;
        wherein
        each of the plurality of tubular fluid channels are formed as a helical coil over at least a part of their lengths, each coil being provided as a plurality of windings, each of said coils evolving with a centre path;
        the coils of the plurality of tubular fluid channels are intertwined around one another with the centre path of each coil being distant from the centre path of the other coils, and each of the centre paths forms a helix, and
        in a transverse cross section of the heat exchanger, a planar representation of a winding of a first of said coils overlaps a planar representation of a winding of each of the other said coils of said plurality of tubular fluid channels.

28. The reactor according to claim 27, wherein said reactor further comprises at least one reactor fluid connection extending into the reactor enclosure for introducing fluid into, or extracting fluid from, said reactor enclosure.

29. The reactor according to claim 28, wherein at least one of said reactor fluid connections is fluidly connected to said plurality of tubular fluid channels.

30. The reactor according to claim 27, wherein said reactor further comprises a plurality of heating and cooling elements on said reactor wall for controlling the level of the supercritical point of said fluid in reference to the height of the heat exchanger.

31. The reactor according to claim 27, further comprising a loose liner in said reactor enclosure.

32. The reactor according to claim 31, wherein a space (gap) ($\Delta_1$, $\Delta_2$) between said loose liner and said reactor wall is in fluid connection with at least one of said reactor fluid connections.

33. The reactor according to claim 31, wherein a space (gap) ($\Delta_1$, $\Delta_2$) between said loose liner and said reactor wall is in fluid connection with at least one of said tubular fluid channels.

34. The reactor according to claim 31, wherein the loose liner completely encloses the reactor enclosure.

35. The reactor according to claim 28, further comprising at least one reactor fluid outlet connection extending into the reactor enclosure for extracting fluid from said reactor enclosure.

36. The reactor according to claim 27, wherein said reactor further comprises an upper oxidation chamber within said reactor enclosure that is in fluid connection with said plurality of tubular fluid channels, said heat exchanger being located beneath said upper oxidation chamber.

37. The reactor according to claim 36, wherein said upper oxidation chamber occupies at least seventy percent of the volume of said reactor enclosure above said heat exchanger.

38. The reactor for supercritical water oxidation according to claim 27 comprising two or more of the heat exchangers.

* * * * *